(12) United States Patent
Goggin et al.

(10) Patent No.: US 10,127,938 B2
(45) Date of Patent: Nov. 13, 2018

(54) METHOD FOR FORMING TE TO TM MODE CONVERTER OF HEAT-ASSISTED MAGNETIC RECORDING HEAD

(71) Applicant: Seagate Technology LLC, Cupertino, CA (US)

(72) Inventors: Aidan Dominic Goggin, Donnegal (IE); Kelly Elizabeth Hamilton, Derry (GB); Paula Frances McElhinney, Derry (GB); Fadi El Hallak, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/784,429

(22) Filed: Oct. 16, 2017

(65) Prior Publication Data
US 2018/0040342 A1 Feb. 8, 2018

Related U.S. Application Data

(62) Division of application No. 15/205,511, filed on Jul. 8, 2016, now Pat. No. 9,792,937.

(51) Int. Cl.
*G11B 11/00* (2006.01)
*G11B 5/48* (2006.01)
(Continued)

(52) U.S. Cl.
CPC ............ *G11B 5/4866* (2013.01); *G02B 6/126* (2013.01); *G02B 6/1228* (2013.01); *G02B 6/132* (2013.01); *G02B 6/136* (2013.01); *G02B 6/2726* (2013.01); *G02B 6/2766* (2013.01); *G11B 5/6088* (2013.01); *G11B 7/1387* (2013.01);
(Continued)

(58) Field of Classification Search
None
See application file for complete search history.

(56) References Cited

U.S. PATENT DOCUMENTS 9,047,912 B1 6/2015 Peng et al.
9,099,130 B2 8/2015 Gubbins et al.
(Continued)

*Primary Examiner* — Tan X Dinh
(74) *Attorney, Agent, or Firm* — Hollingsworth Davis, LLC

(57) ABSTRACT

An apparatus includes an input coupler configured to receive light excited by a light source. A near-field transducer (NFT) is positioned at a media-facing surface of a write head. A layered waveguide is positioned between the input coupler and the NFT and configured to receive the light output from the input coupler in a transverse electric (TE) mode and deliver the light to the NFT in a transverse magnetic (TM) mode. The layered waveguide comprises a first layer extending along a light-propagation direction. The first layer is configured to receive light from the input coupler. The first layer tapers from a first cross track width to a second cross track width where the second cross track width is narrower than the first cross track width. The layered waveguide includes a second layer that is disposed on the first layer. The second layer has a cross sectional area in a plane perpendicular to the light propagation direction that increases along the light propagation direction. The cross sectional area of the second layer is smaller proximate to the input coupler and larger proximate to the NFT.

20 Claims, 16 Drawing Sheets

(51) Int. Cl.
G02B 6/136 (2006.01)
G02B 6/132 (2006.01)
G02B 6/122 (2006.01)
G02B 6/126 (2006.01)
G02B 6/27 (2006.01)
*G11B 11/105* (2006.01)
*G11B 5/60* (2006.01)
*G11B 7/1387* (2012.01)
*G11B 5/00* (2006.01)

(52) U.S. Cl.
CPC ..... *G11B 11/1051* (2013.01); *G11B 11/10506* (2013.01); *G11B 2005/0021* (2013.01)

(56) References Cited

U.S. PATENT DOCUMENTS

| | | | |
|---|---|---|---|
| 9,202,493 B1 | 12/2015 | Wan et al. | |
| 9,746,623 B2* | 8/2017 | Peng | G02B 6/4215 |
| 9,786,314 B1* | 10/2017 | Peng | G11B 13/08 |
| 2011/0217003 A1* | 9/2011 | Gage | G11B 5/314 |
| | | | 385/30 |
| 2012/0082016 A1 | 4/2012 | Komura et al. | |
| 2012/0230168 A1* | 9/2012 | Izawa | G02B 6/10 |
| | | | 369/13.32 |
| 2013/0064514 A1* | 3/2013 | Peng | G11B 5/3133 |
| | | | 385/124 |
| 2013/0108212 A1* | 5/2013 | Peng | G02B 6/4215 |
| | | | 385/15 |
| 2014/0293761 A1 | 10/2014 | Jin et al. | |
| 2015/0170675 A1* | 6/2015 | Shimazawa | G11B 5/314 |
| | | | 369/13.33 |
| 2015/0248906 A1 | 9/2015 | Itagi et al. | |
| 2015/0262597 A1 | 9/2015 | Peng et al. | |
| 2015/0279394 A1* | 10/2015 | Peng | G02B 6/14 |
| | | | 385/28 |
| 2016/0133285 A1* | 5/2016 | Peng | G02B 6/1226 |
| | | | 369/13.33 |
| 2016/0247525 A1 | 8/2016 | Lee et al. | |
| 2016/0379677 A1* | 12/2016 | Van Orden | G11B 5/6088 |
| | | | 369/13.23 |
| 2017/0221505 A1* | 8/2017 | Staffaroni | G10L 21/0216 |

* cited by examiner

METHOD FOR FORMING TE TO TM MODE CONVERTER OF HEAT-ASSISTED MAGNETIC RECORDING HEAD

RELATED PATENT DOCUMENTS

This application is a divisional of U.S. Ser. No. 15/205,511 filed on Jul. 8, 2016, now U.S. Pat. No. 9,792,937, to which priority is claimed and which is incorporated herein by reference in its entirety.

SUMMARY

Embodiments are directed to an apparatus comprising an input coupler configured to receive light excited by a light source. A near-field transducer (NFT) is situated at a media-facing surface of a write head. A layered waveguide is positioned between the input coupler and the NFT and configured to receive the light output from the input coupler in a transverse electric (TE) mode and deliver the light to the NFT in a transverse magnetic (TM) mode. The layered waveguide comprises a first layer extending along a light-propagation direction. The first layer is configured to receive light from the input coupler. The first layer tapers from a first cross track width to a second cross track width where the second cross track width is narrower than the first cross track width. A second layer is disposed on the first layer. The second layer has a cross sectional area in a plane perpendicular to the light propagation direction that increases along the light propagation direction. The cross sectional area of the second layer is smaller proximate to the input coupler and larger proximate to the NFT.

A method for forming a write head involves depositing a first waveguide layer. A second waveguide layer is deposited adjacent to the first waveguide layer. A first mask is applied to a substrate parallel surface of the second waveguide layer creating a masked portion and an exposed portion of the second waveguide layer. The exposed portion of the second waveguide layer is etched. A second mask is applied to the substrate parallel surface of the second waveguide layer. The exposed sections of both the first and the second waveguide layers are milled. The second layer has a cross sectional area in a plane perpendicular to the light propagation direction that increases along the light propagation direction. The cross sectional area of the second layer is smaller proximate to the input coupler and larger proximate to the NFT.

Embodiments are directed to an apparatus, comprising: an input coupler configured to receive light excited by a light source. The apparatus includes a near-field transducer (NFT) at a media-facing surface of a write head. A layered waveguide is positioned between the input coupler and the NFT. The layered waveguide is configured to receive the light output from the input coupler in a transverse electric (TE) mode and deliver the light to the NFT at a transverse magnetic (TM) mode. The layered waveguide comprises a first portion extending along a light-propagation direction and configured to receive light from the input coupler. The waveguide includes a mode conversion region coupled to the first portion and having a constant cross sectional width. The first portion tapers from a first cross track width to the constant second cross track width. The constant cross track width is narrower than the first cross track width. The mode conversion region has a cross sectional area in a plane perpendicular to the light propagation direction that increases along the light propagation direction where the cross sectional area is smaller proximate to the input coupler and larger proximate to the NFT. The layered waveguide includes a second portion coupled to the mode conversion region and extending along the light propagation direction between the mode conversion region and the NFT.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
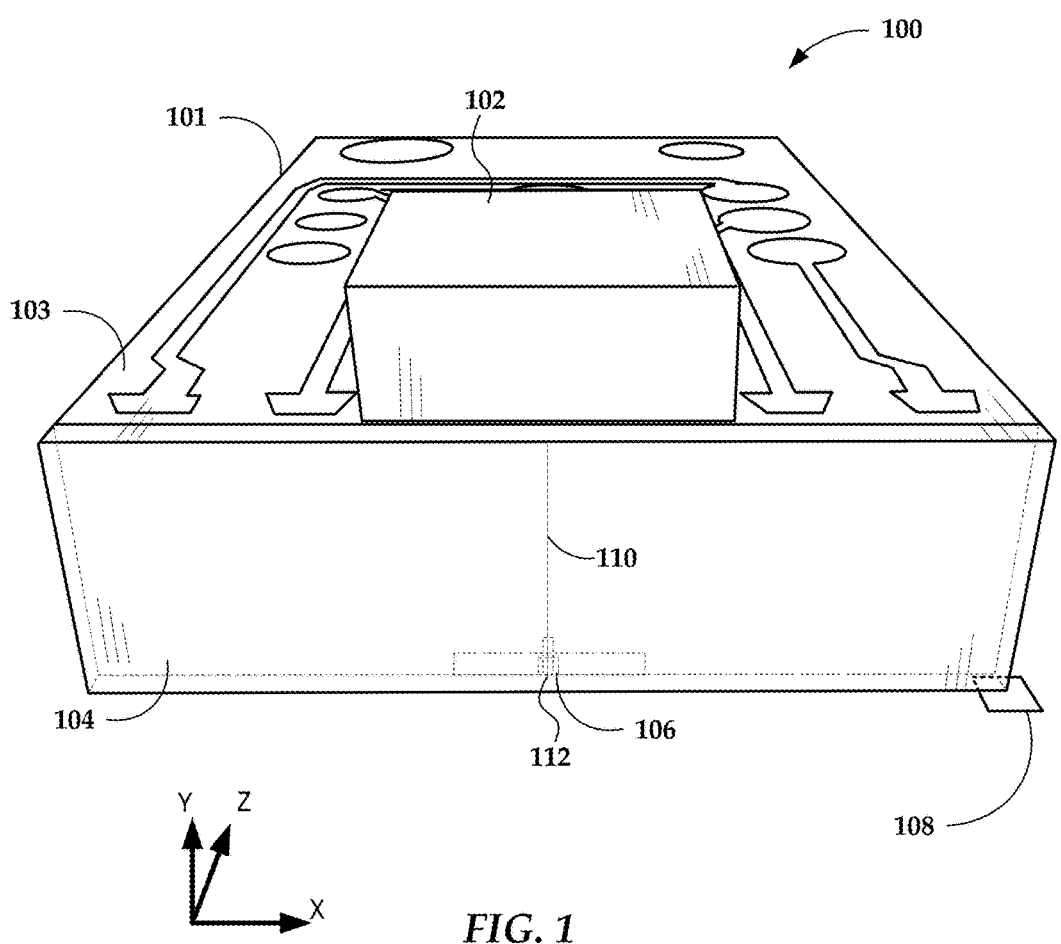
FIG. 1 is a perspective view of a hard drive slider that includes a waveguide in accordance with embodiments described herein.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

A light source may have a TE-like (transverse electric) output beam profile. However, a transverse magnetic (TM) mode may be desired for coupling with some configurations of plasmonic transducers. Embodiments below include a waveguide system that provides mode order conversion rotation including a TE to TM mode. It will be understood that the embodiments below may be configured to excite other modes in some configurations.

According to various implementations, a waveguide is used to convert input TE mode light from a light source into TM mode light. An optical waveguide has a cross sectional area in a plane perpendicular to the light propagation direction that increases along the light propagation direction. This is accomplished by using a layered waveguide having two or more layers. The TE mode light is input into the waveguide in a first layer. As light travels along the light propagation direction a second waveguide layer at least partially overlaps the first waveguide layer in a mode conversion region. The mode conversion region causes a rotation of the polarization of the light as it propagates along the length of the waveguide. The converted light then exits the waveguide in a TM mode. The length, width and/or height of the mode converter region can be adjusted to give partial or total conversion from TE to TM.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a mode converting waveguide system 110, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
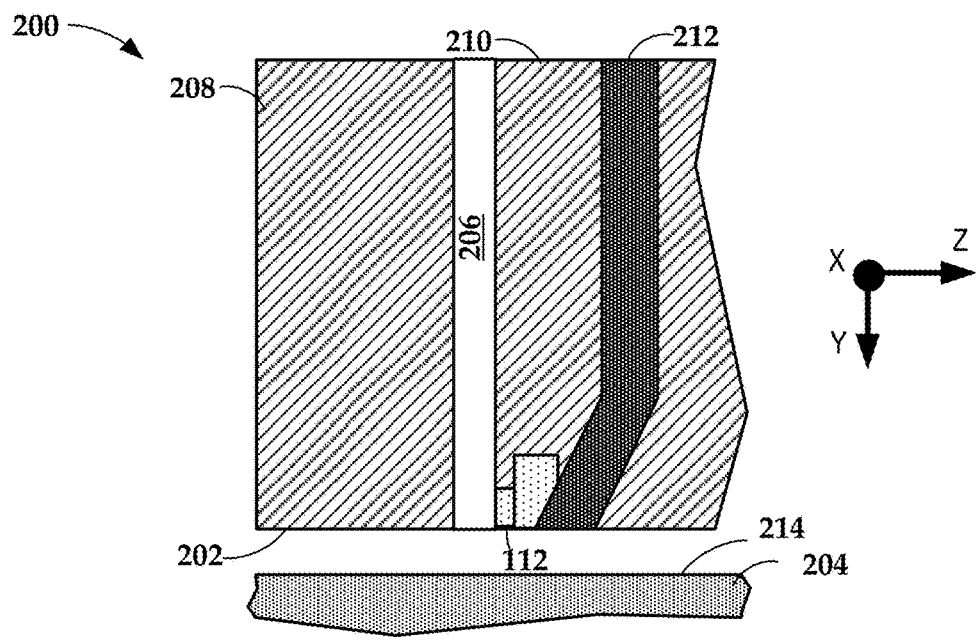
FIG. 2 is a cross-sectional view shows details of a HAMR apparatus according to various implementations.

In reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. A portion of the waveguide core (not shown) converts the light from a TE mode to a TM mode. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a recording pole 212 of the read/write head that is located alongside the NFT 112. The recording pole 212 generates a magnetic field (e.g., perpendicular field) used in changing the magnetic orientation of the hotspot during writing.

According to various embodiments described herein, a layered waveguide may be used. The layered waveguide has a mode conversion region that converts light from an input TE mode into a TM mode. Light is received from the input coupler in a section of the waveguide having first cross sectional area in a plane perpendicular to the light propagation direction. The cross sectional area may increase as the light travels through the mode conversion region of the waveguide. This may be achieved by using two or more layers to create the different cross sectional area along the light propagation direction.

Figure 3A:
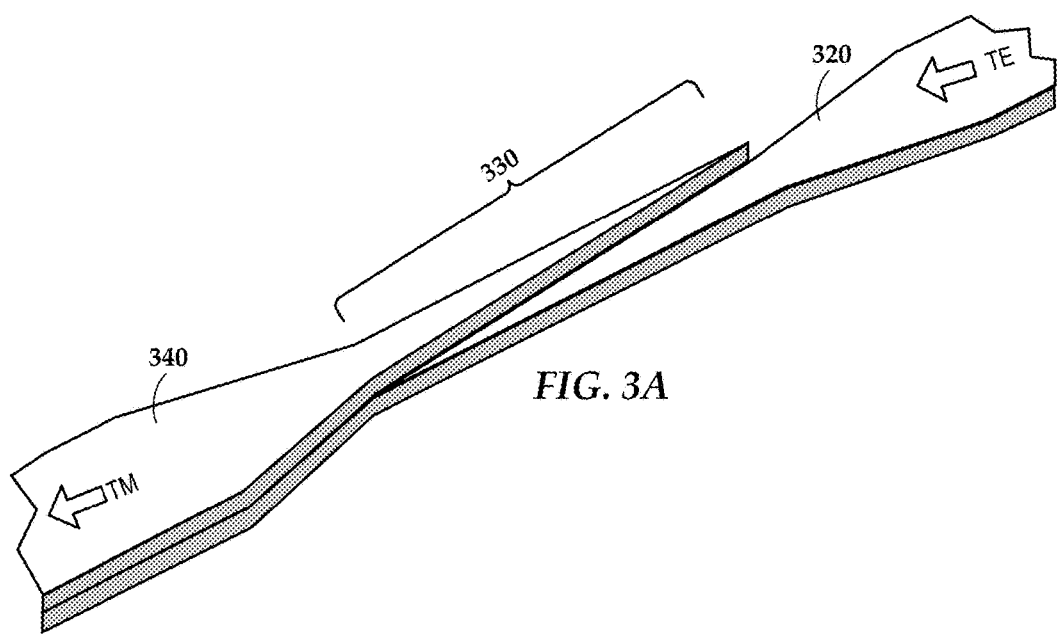
FIG. 3A illustrates a three dimensional view of a portion of a waveguide having one or more layers in accordance with some aspects.

FIG. 3A illustrates a three dimensional view of a portion of a waveguide having two layers. FIG. 3A shows the first waveguide layer 320 of the waveguide. The first waveguide layer 320 includes a first taper at a TE mode input end, a straight portion having a constant cross-sectional width, and a second tapered region where light is output in a TM mode. FIG. 3A further illustrates the waveguide with a second waveguide layer 340 on the first waveguide layer 320. The second waveguide layer partially overlaps with the first waveguide layer 320 in a mode conversion region 330 and slowly tapers to completely overlap with the first waveguide layer 320 at or near the second taper of the first waveguide layer 320. The light then exits the waveguide in a TM mode.

Figure 3B:
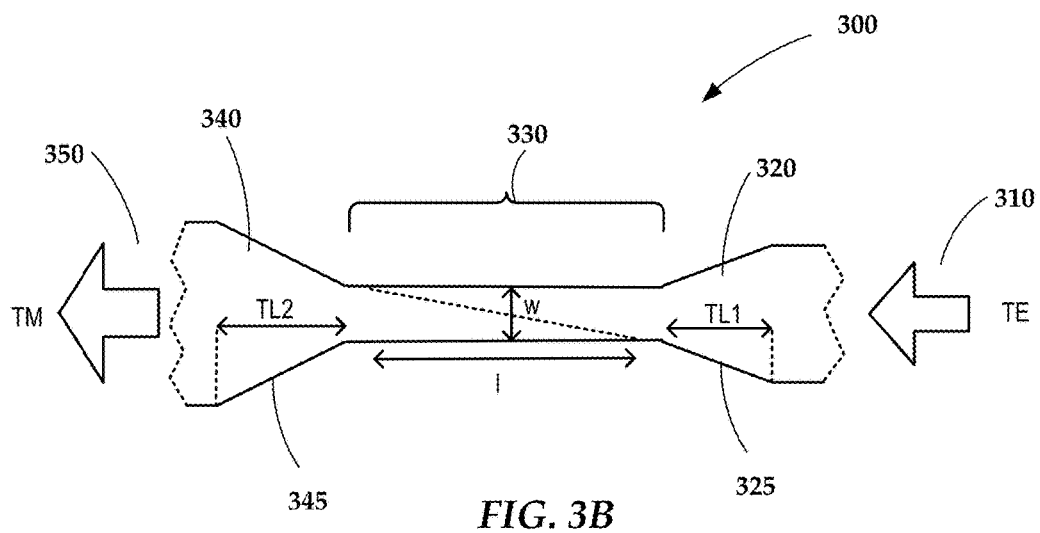
FIGS. 3B and 3C show the mode conversion region of the layered waveguide according to various embodiments.

FIG. 3B shows a top view of the mode conversion region of layered waveguide 300 in accordance with embodiments described herein. TE mode light 310 is input into the waveguide 300 into a tapered region 325 of a first waveguide layer 320. The light then travels through a mode conversion region 330 of the waveguide 300. In the mode conversion region 330, the first waveguide layer 320 overlaps with a second waveguide layer 340. The change in cross-sectional structure of the waveguide 300 at the mode conversion region 330 causes a rotation of the polarization of the light as it propagates along the length of the waveguide. The light then travels through a tapered region 345 of the second waveguide layer and light exits the layered waveguide in substantially a TM mode 350.

The dimensions of the layered waveguide may vary depending on design considerations. For example, the dimensions may vary based on the materials of the waveguide and/or the cladding layers. The length of the mode conversion region may enable an optimal conversion of TE mode light into TM mode light. For example, the length may be based on achieving a peak amount of TM mode light to exit the mode conversion region or may be based on achieving at least a predetermined percentage of TM mode light exiting the waveguide. The length of the mode conversion region may be in the range of about 20-35 μm, for example.

Similarly, the width of the mode conversion region may be based on an optimal or desired amount of conversion between the TE mode and TM mode. For example, the width of the mode conversion region may be in the range of about 150-650 nm or about 270-350 nm. The length of the first and second taper may also change based on the materials or the cladding configuration of the waveguide system. The length of the first waveguide taper (TL1) and the second waveguide taper (TL2) may have the same or different values. For example, the length of the first waveguide taper may be in a range of about 3-15 nm. The length of the second waveguide taper may be in the range of about 3-15 nm.

Figure 3C:
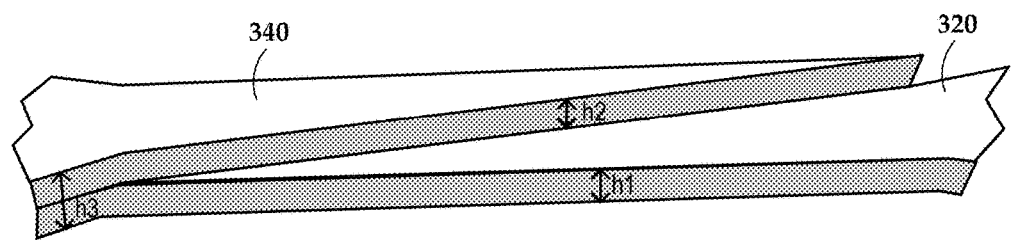

The height of the various waveguide layers may also depend on a predetermined percentage of TM. FIG. 3C shows a three dimensional view of the mode conversion region 330 of the waveguide. The height of the first layer (h1) may be in the range of about 50-400 nm The height of the second layer (h2) may have substantially the same value or a different value than that of h1. According to various embodiments, h2 is in a range of about 50-400 nm.

The total height of the waveguide (h3) may vary depending on the position of a cross section perpendicular to the light propagation direction. Moving along the light propagation direction, the second waveguide layer 340 partially overlaps the first waveguide layer 320 within the mode conversion region of the layered waveguide. The value of h3 at the overlapping portion is the sum of h1, h2, and the height of any intermediate layers, e.g., stop layer for formation of the layered waveguide design. While, FIG. 3C shows the amount of exposed surface to be about equal for the first waveguide layer 320 and the second waveguide layer 340 in the mode conversion region, it is to be understood that the first layer or the second layer may have a higher exposed surface area in the mode conversion region.

Figure 4A:
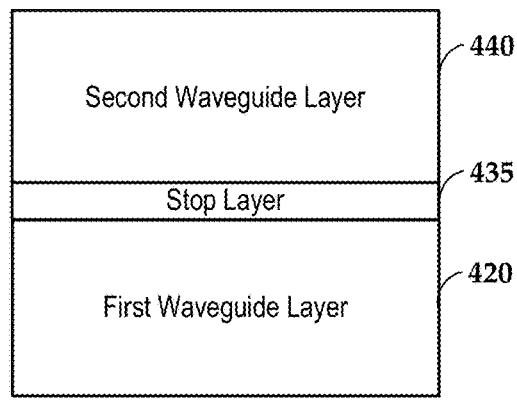
FIG. 4A illustrates a cross section of the waveguide system having a first layer, a second layer, and a stop layer in accordance with some aspects.
Figure 4B:
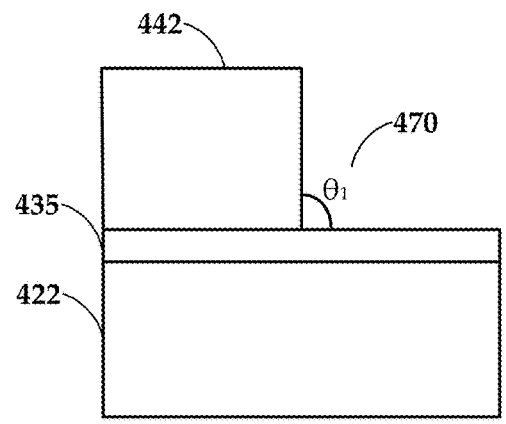
FIGS. 4B and 4C illustrate a cross-section of the mid-point of the mode conversion section according to various embodiments.
Figure 4C:
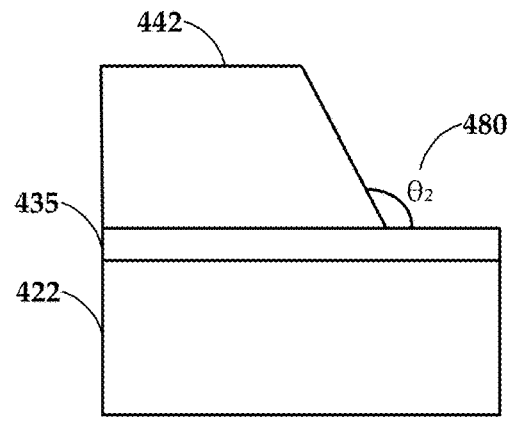

FIG. 4A illustrates a cross section of the waveguide system having a first layer 420 and a second layer 440. In this embodiment, a stop layer 435 is disposed between the first waveguide layer 420 and the second waveguide layer 440. FIGS. 4B and 4C show a cross-section of the mid-point of the mode conversion section along the propagation direction in which the second waveguide layer 442 starts to overlap with the first waveguide layer 422. The angle at which the second waveguide layer 442 interfaces with the first waveguide layer 422 and/or the stop layer 435 may vary based on design characteristics. For example, the second waveguide layer may interface the stop layer at about a 90° angle as shown by $\theta_1$ 470 in FIG. 4B. In some cases, the interface angle is greater than 90° as shown by $\theta_2$ 480 in FIG. 4C. For example, the interface angle may be about 90°-150° or about 90°-110°, for example.

FIGS. 5A-5F illustrate a process for forming a layered waveguide in accordance with embodiments described herein. A first waveguide layer 520 is deposited. A stop layer 535 is then formed on top of the first waveguide layer 520. The stop layer 535 may be formed of Yttria, for example. A second waveguide layer 540 is formed on the stop layer 535. The first waveguide layer 520 and the second waveguide layer 540 can be made of $NbO_x$, for example. In some cases, the first and second waveguide layers are made of different materials.

Figure 5A:
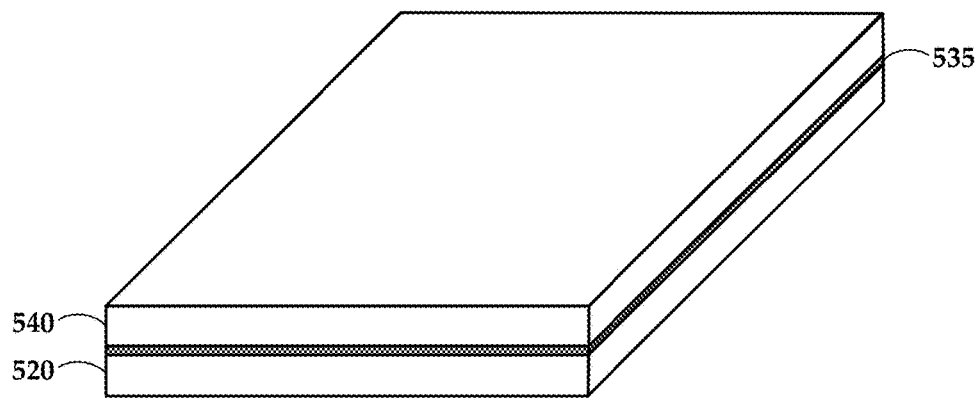
FIGS. 5A-5F illustrate a process for forming a layered waveguide in accordance with embodiments described herein.
Figure 5B:
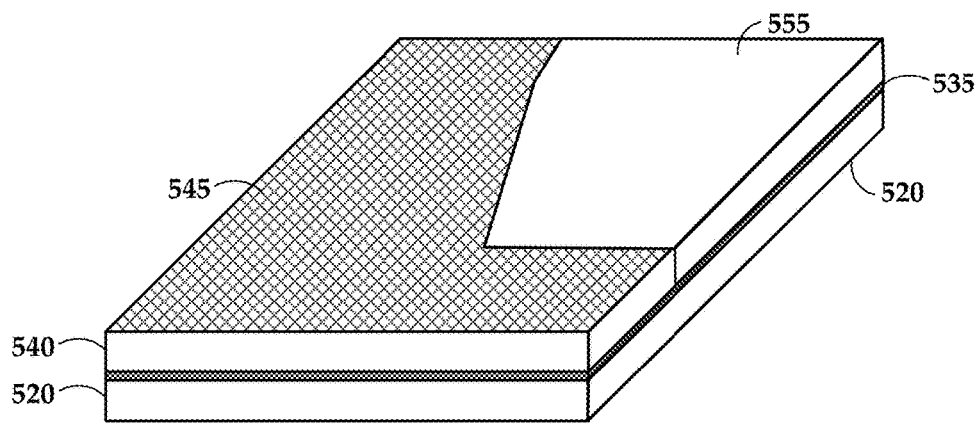
Figure 5C:
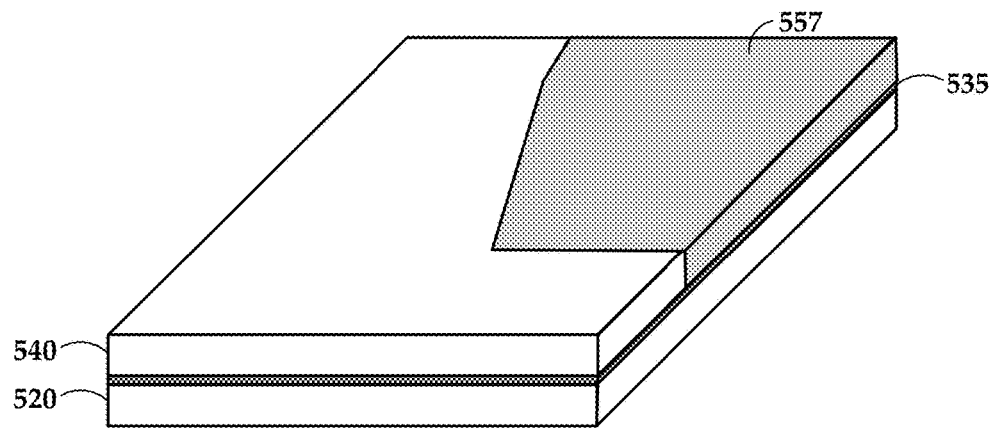

In FIG. 5B, a first mask 545 is applied to an exposed surface of the second waveguide layer 540. The exposed region 545 is etched to the stop layer 535. After the etching, the exposed section 455 can be filled with a cladding material 557 as shown in FIG. 5C. The cladding material may be $SiO_2$ or AlO, for example. In some cases, more than one cladding material is added to the etched out region.

Figure 5D:
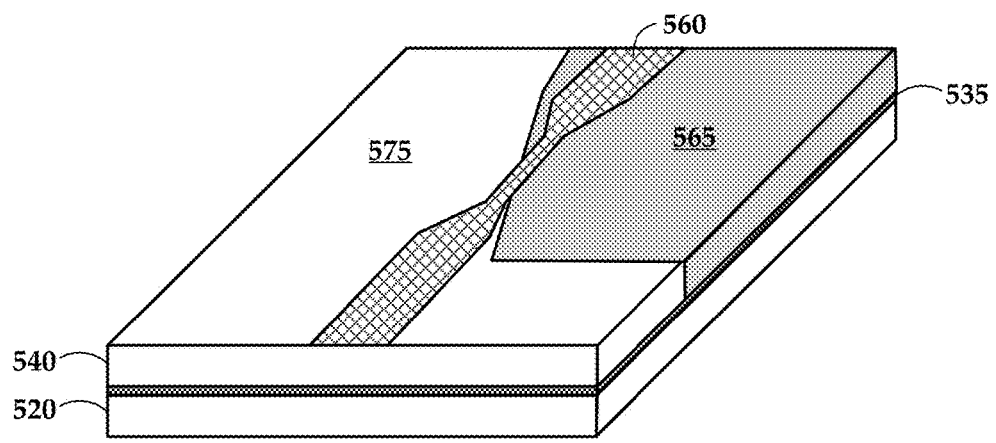
Figure 5E:
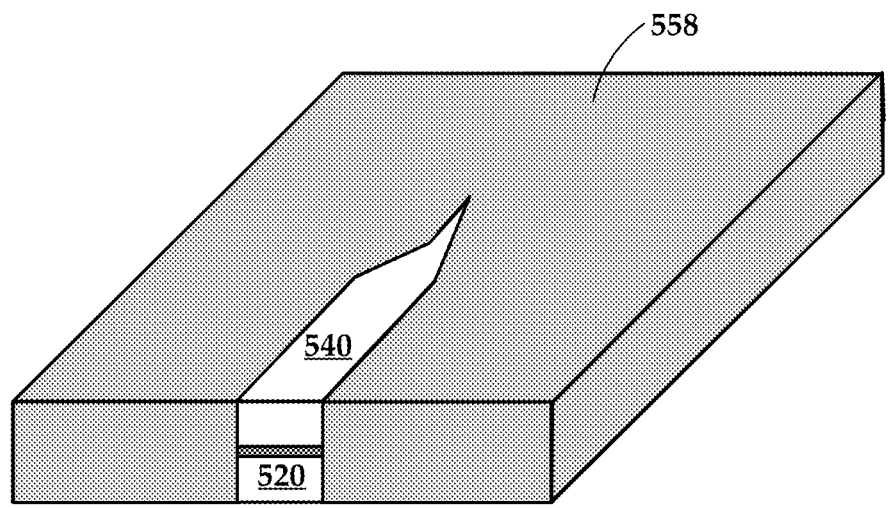
Figure 5F:
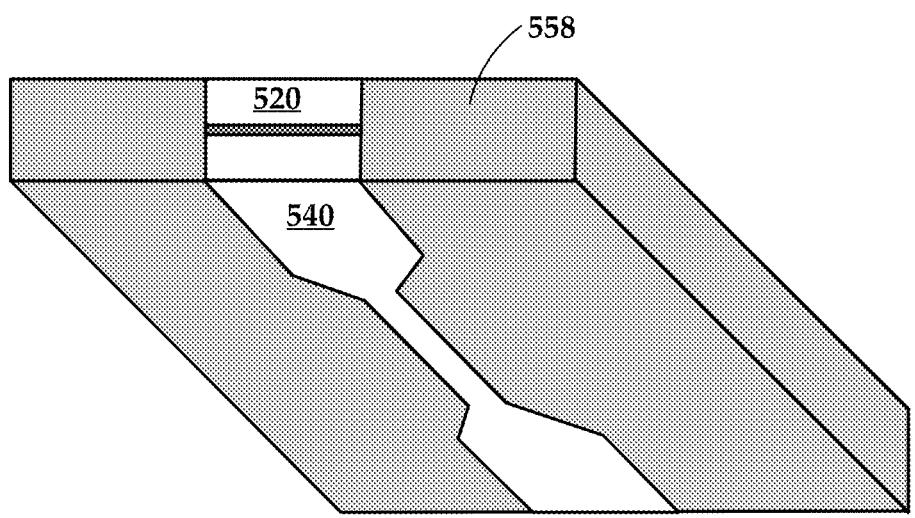

A second mask 560 is then used for a second etching and/or milling process as shown in FIG. 5D. The exposed sections 575, 565 are milled to create the final waveguide structure. The milled or etched out regions are then filled in with cladding material 558. The resulting structure is shown in FIG. 5E. According to various implementations, the second mask and resulting etching/milling process is applied before the first mask. A bottom view of the resulting waveguide is shown in FIG. 5F. While FIGS. 5A-5F show the process of creating a layered waveguide using a stop layer, it is to be understood that the formation of the layered waveguide structure may be done without the stop layer.

Figure 6:
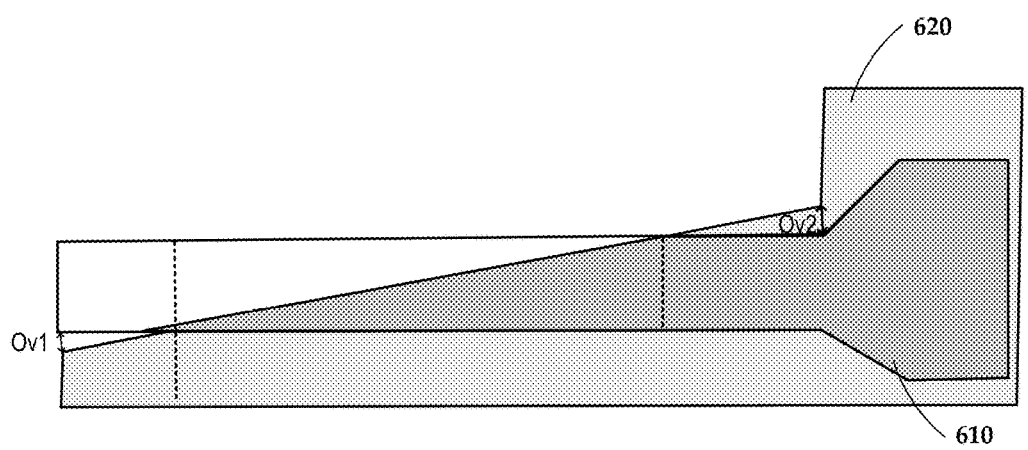
FIG. 6 illustrates an example of having a mask overlay variation in according to some embodiments.

According to various implementations, the process for creating the layered waveguide allows for the first mask or the second mask to have positional variations. For example, the mask may be designed to allow for a variation of 50 nm or less and still have substantially the same percentage of output TM. These variations may be horizontal or vertical. This slight variation may result in different start and end positions of the mode conversion region If the variation of the mask overlay is known, the effective lengths of the mode conversion region can be calculated using the variation value and the constant angle FIG. 6 illustrates an example of having an overlay variation in the first or the second mask. FIG. 6 shows the waveguide 610 and a mask 620 placed on the waveguide. There is a slight variation in the overlay of the mask on the waveguide 610 as shown by the overlay variations (Ov1 and Ov2). The overlay variations 630 may have an allowance of 50 nm or less according to various embodiments. In some cases the overlay variations is greater than 50 nm. Ov2 and Ov2 may have about the same value or may be different values.

Figure 7A:
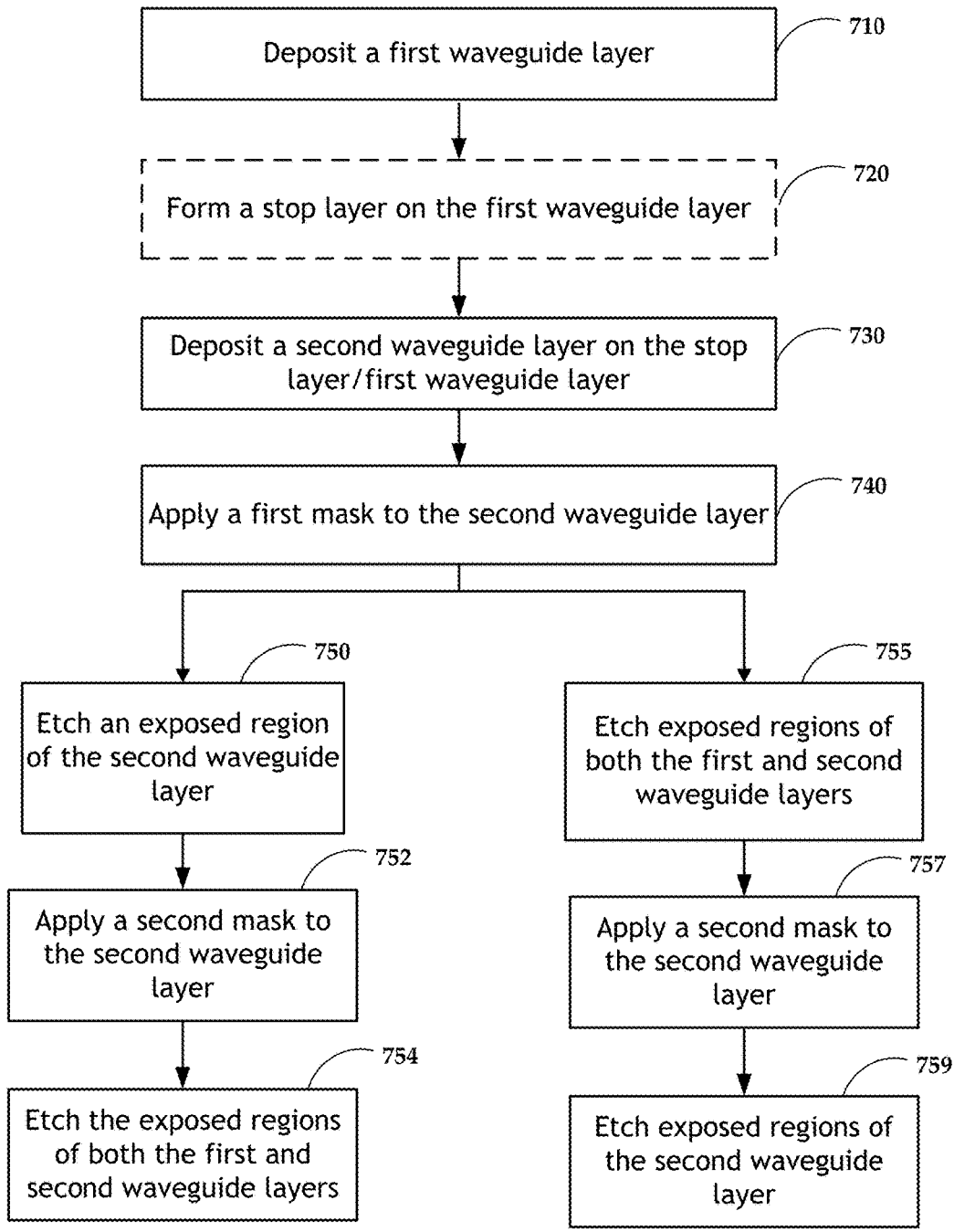
FIGS. 7A-7B are flow diagrams that describe a processes of creating the layered waveguide structure according to various implementations.

FIG. 7A is a flow diagram that describes a process of creating the layered waveguide structure in accordance with various embodiments described herein. A first waveguide layer is deposited 710. Optionally, a stop layer is formed 720 on the first waveguide layer. A second waveguide layer is deposited 730 on the stop layer and/or the second waveguide layer. A first mask is applied 740 to a substrate parallel surface of the second waveguide layer. The mask creates a masked portion and an exposed portion of the substrate parallel surface of the second waveguide layer. In some cases, the exposed region of the second waveguide layer is etched 750 to the stop layer. The etched region may be filled with a cladding material. A second mask is applied 752 to the second waveguide layer. The exposed regions along a substrate parallel surface of the second waveguide layer, the first waveguide layer, and the stop layer are etched and/or milled 754. The etched region may be filled with a cladding material having a different index of refraction from the first waveguide layer and the second waveguide layer.

According to various implementations, after the first mask is applied to the second waveguide layer, the exposed regions along a substrate parallel surface of the second waveguide layer, the first waveguide layer, and the stop layer are etched and/or milled 755 and a cladding material is added to the etched portion. A second mask is applied 757 to the second waveguide layer. Exposed regions of the second waveguide layer are etched 759 and filled with a cladding material.

Figure 7B:
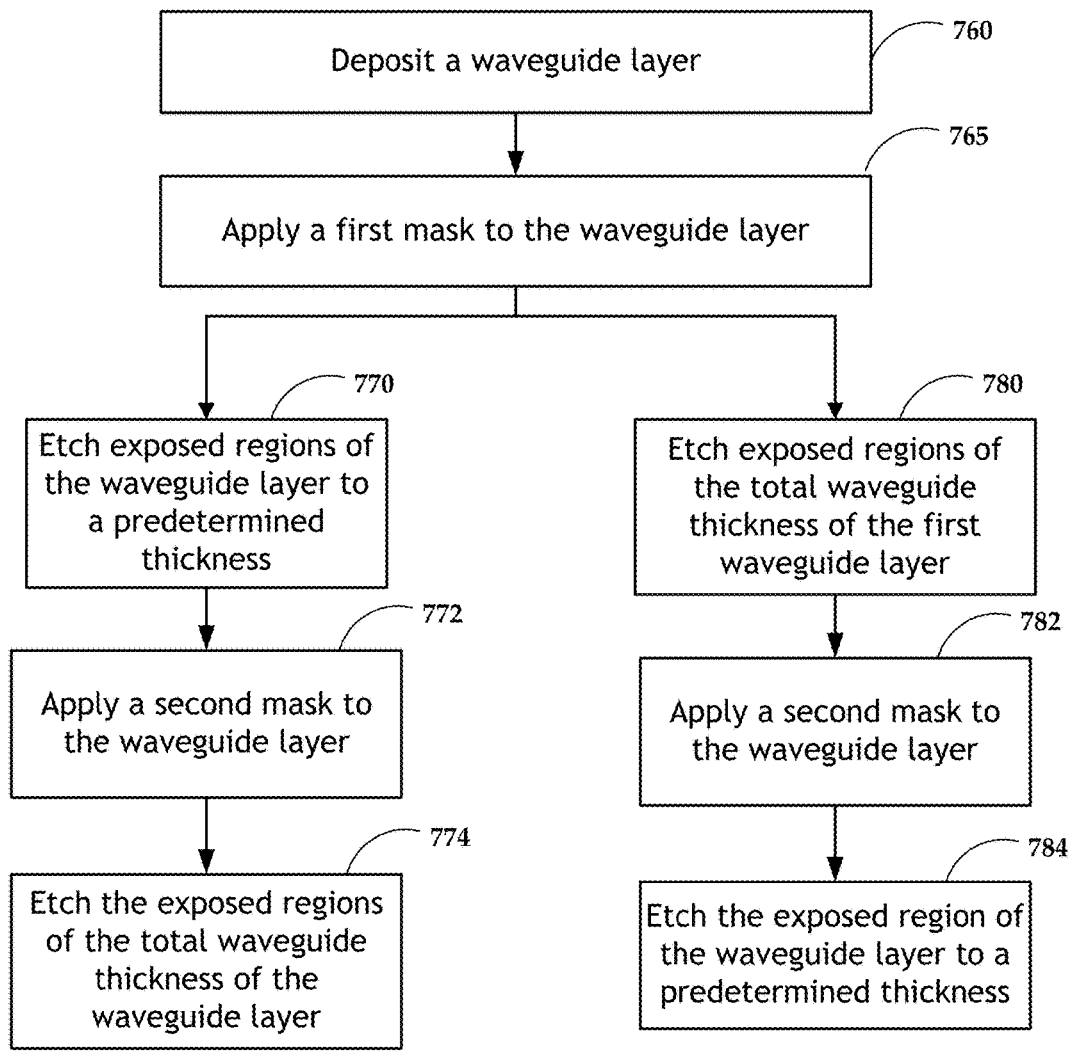

FIG. 7B shows a flow diagram that describes a process for creating the layered waveguide structure without using a stop layer. A waveguide layer is deposited 760. A first mask is applied to the waveguide layer 765. The mask creates a masked portion and an exposed portion of the substrate parallel surface of the waveguide layer. In some configurations, an exposed region of the waveguide layer is etched 770 to a predetermined thickness. In some cases, the predetermined thickness is about halfway through the thickness of the waveguide layer. A second mask is applied 772 to the waveguide layer. The exposed regions of the waveguide layer are etched to a total thickness of the waveguide layer. In some cases, after applying the first mask to the waveguide layer, exposed regions of the waveguide layer are etched 780 to a total thickness of the waveguide layer. A second mask is applied 782 to the waveguide layer. Exposed regions of the waveguide layer are etched 784 to a predetermined thickness. In some cases, the predetermined thickness is about halfway through the thickness of the waveguide layer. As in FIG. 7A, the etched regions may be filled with a cladding material having a different index of refraction from the waveguide layer.

The processes of FIGS. 7A and 7B result in a structure where the waveguide layer has a cross sectional area in a plane perpendicular to the light propagation direction that increases along the light propagation direction, the cross sectional area being smaller proximate to an input coupler and larger proximate to an NFT.

Figure 8A:
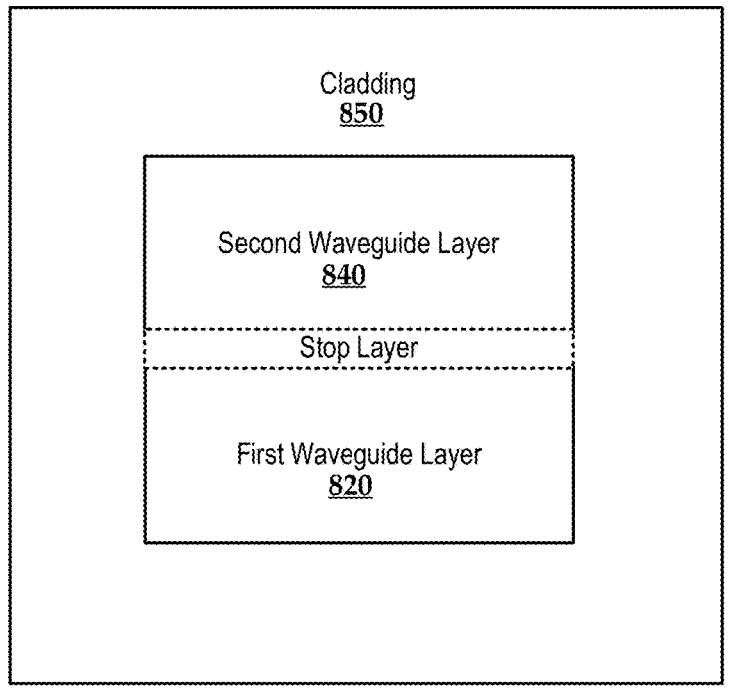
FIGS. 8A-8E illustrate cross sections of layered waveguides having different cladding configurations according to various embodiments described herein.

The layered waveguide system may have various cladding configurations that surround the layered waveguide in accordance with various embodiments described herein. FIG. 8A includes a first waveguide layer 820, a stop layer 835, and a second waveguide layer 840. A cladding layer 850 is disposed around the layered waveguide. The cladding layer may comprise a dielectric material such as $SiO_2$, for example. As stated previously, the stop layer is optional and may not be included. For example, FIG. 8E illustrates a layered waveguide system without a stop layer.

The dimensions of the layered waveguide may be different depending on the materials of the cladding and the waveguide layers. The dimensions of the mode conversion section of the waveguide may be based on an amount of output TM from the mode conversion region. For example, the width of the mode conversion section of the waveguide may be in the range of about 270-350 nm or be in the range of about 330-350 nm. According to various implementations, the width of the mode conversion region is about 325 nm. The length of the mode conversion region of the waveguide may be about 25-45 μm or may be about 30-35 μm. According to various implementations, the length of the mode conversion region is about 32 μm. The length of the mode conversion region of a waveguide material of $TaO_x$ may be about 10 μm higher than the length of the mode conversion region having a $NbO_x$ waveguide material. The chosen length may correspond to a desired percentage of TM provided at the output of the mode conversion region of the waveguide. The desired amount of TM may correspond to a peak amount of TM or may be a different value.

Figure 8B:
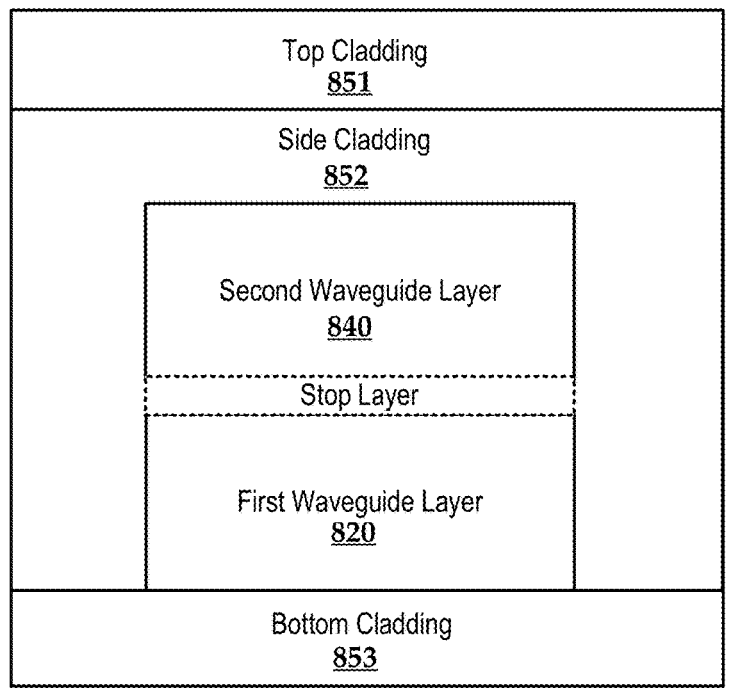

FIG. 8B illustrates another layered waveguide system in accordance with various embodiments. Similarly to FIG. 8A, FIG. 8B includes a first waveguide layer 820, an optional stop layer 835, and a second waveguide layer 840. Side cladding 852 surrounds the exposed portions of the second waveguide layer 840 and the stop layer 835 and portions of the exposed portions of the first waveguide layer 820. A bottom cladding layer 853 may be in contact with the first waveguide layer 820. A top cladding layer 851 is also used as shown in FIG. 8B. According to various embodiments, the top cladding layer 851 and the bottom cladding layer 853 comprise the same or similar materials. For example, the top cladding layer 851 and the bottom cladding layer 853 may comprise $SiO_2$. According to various implementations, the top cladding layer 851 and the bottom cladding layer 853 comprise different materials. The side cladding layer 852 may comprise a different material than either of the top cladding layer 851 or the bottom cladding layer 853. For example, the side cladding layer 852 may comprise AlO. The configuration shown in FIG. 8B may have a longer mode conversion region length than the configuration of FIG. 8A. For example, the mode conversion region may have a length between 80 and 125 μm, for example. The width of the mode conversion region of the waveguide may be between 200 and 250 nm for example. In some cases, the width is about 300 nm and the length is about 125 μm.

Figure 8C:
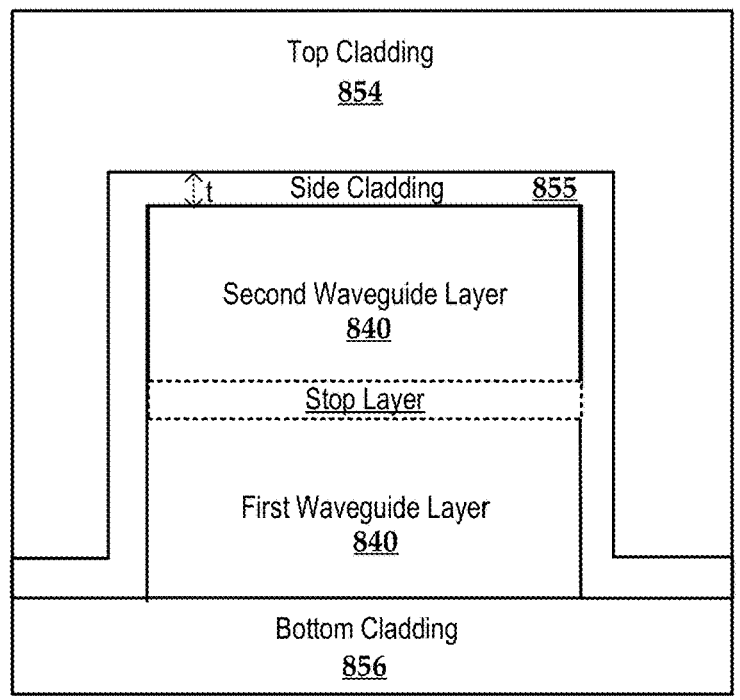

FIG. 8C shows another layered waveguide system in accordance with various embodiments. Similarly as in FIGS. 8A and 8B, FIG. 8C includes a first waveguide layer 820, an optional stop layer 835, and a second waveguide layer 840. FIG. 8C has a similar cladding configuration as that of FIG. 8B except that the side cladding layer 855 is thinner and the top cladding layer 854 extends along the sides of the side cladding layer 855. The thin side cladding 855 surrounds the exposed portions of the second waveguide layer 840 and the stop layer 835 and portions of the exposed sections of the first waveguide layer 820. A bottom cladding layer 856 may be in contact with the first waveguide layer 820. An extended top cladding layer 854 may also encompass portions of the side cladding layer 855. According to various embodiments, the top cladding layer 854 and the bottom cladding layer 856 comprise the same or similar materials. For example, the top cladding layer 854 and the bottom cladding layer 856 may comprise $SiO_2$. According to various implementations, the top cladding layer 854 and the bottom cladding layer 856 comprise different materials. The thin side cladding layer 855 may comprise a different material than either of the top cladding layer 854 and the bottom cladding layer 856. For example, the thin side cladding layer 855 may comprise AlO.

For the cladding configuration shown in FIG. 8C, the width and length of the mode conversion region of the waveguide may depend on the thickness (t) of the thin side cladding layer 855. A configuration with a thinner side cladding layer may result in a greater length and a greater width than a configuration with a thicker side cladding layer, for example. For a side cladding layer 855 thickness of about 100 nm, the width of the mode conversion region may be in the range of about 260-280 nm or about 270 nm. The length of the mode conversion region having using a thin side cladding layer 655 of about 100 nm may be in the range of about 25-35 μm or be about 32 μm, for example. For a thin side cladding layer 855 thickness of about 70 nm, the width of the mode conversion region may be in the range of about 260-290 nm or about 285 nm. The length of the mode conversion region using a side cladding layer of about 70 nm may be in the range of about 25-35 μm or be about 31 μm, for example. For a side cladding 855 thickness of about 20 nm, the width of the mode conversion region may be in the range of about 290-330 nm or about 310 nm. The length of the mode conversion region having a side cladding layer 855 thickness of about 20 nm may be in the range of about 25-40 μm or be about 30 μm, for example.

Experiments were performed to determine values for the length and width of the mode conversion region in a waveguide system having different side cladding thicknesses. Table 1 shows approximate values for dimensions of the layered waveguide at different side cladding thicknesses and the resulting output mode as well as the Power Transmission Efficiency (TTotal).

TABLE 1

|  | 20 nm AlO | 70 nm AlO | 100 nm AlO |
| --- | --- | --- | --- |
| TM (%) | 99.6 | 98.1 | 98.9 |
| TE (%) | 0.07 | 1.17 | 0.15 |
| TTotal (%) | 99.3 | 99.3 | 99.1 |
| Length (μm) | 32 | 31 | 30 |
| Width (nm) | 310 | 285 | 270 |

Figure 8D:
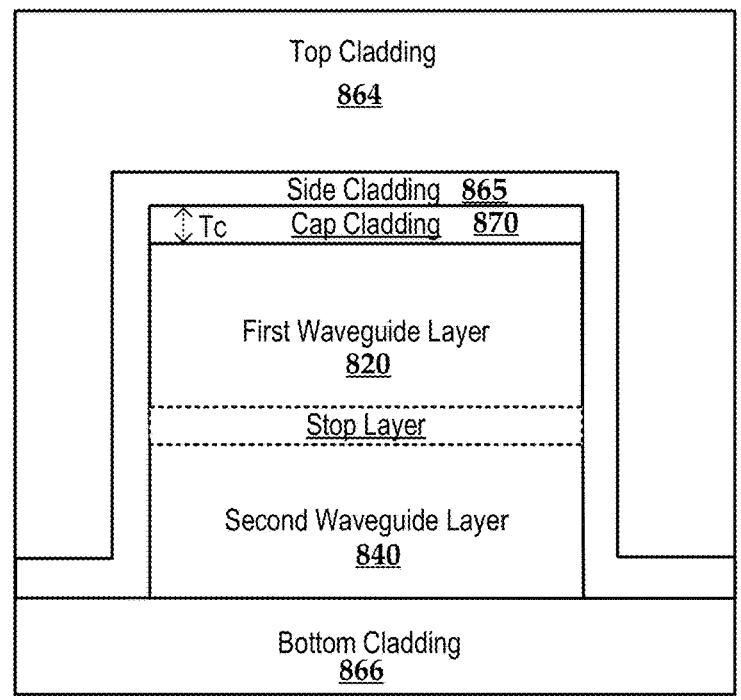
Figure 8E:
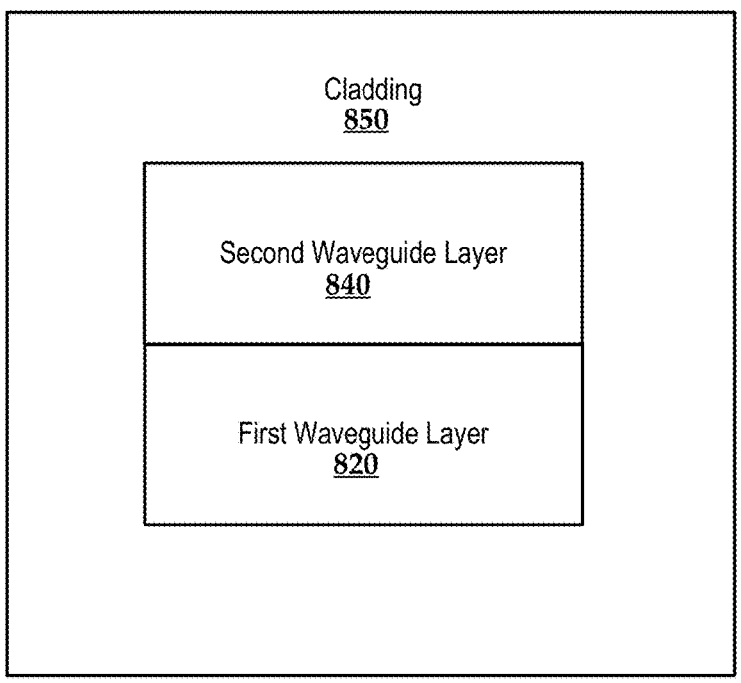

FIG. 8D shows another layered waveguide system in accordance with various embodiments. Similarly as in FIGS. 8A and 8B, and 8C, FIG. 8D includes a first waveguide layer 820, an optional stop layer 835, and a second waveguide layer 840. FIG. 8D has a similar cladding configuration as that of FIG. 8C except an additional cap cladding layer 870 is formed between the thin side cladding layer 865 and the top cladding layer 864. FIG. 8D also shows a top cladding layer 864 and a bottom cladding layer 866. The cap cladding layer 870 may have various thicknesses (Tc). For example, the cap cladding layer 870 may have a thickness in the range of about 130-210 nm. In some cases, the thickness of the cap cladding layer 870 is 200 nm. In this example, the length of the mode conversion region of the waveguide may be in a range of about 28-48 μm or be in a range of about 28-35 μm. According to various implementations, the length of the mode conversion region is about 30 μm. The width of the mode conversion region of the waveguide may be in a range of about 285-405 nm or may be in a range of about 285-325 nm. According to various implementations, the cap cladding layer 870, top cladding layer 864, and bottom cladding layer 866 comprise SiO2 and the side cladding layer 865 comprises AlO. While each of FIGS. 8A-8D show systems having an optional stop layer, it is to be understood that any of the systems in 8A-8D can be formed without the stop layer as in FIG. 8E, for example.

Figure 9A:
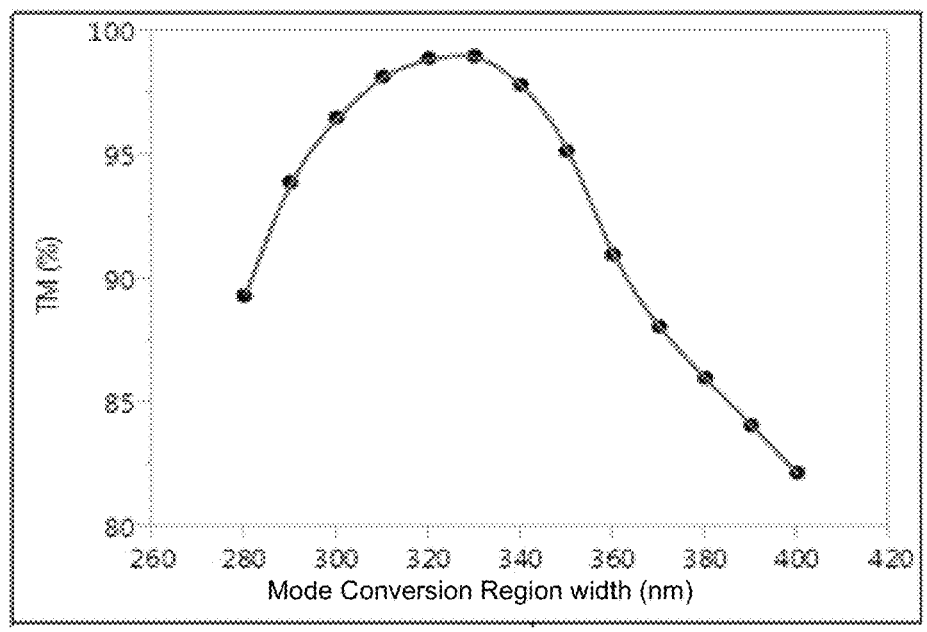
FIGS. 9A-9D illustrate the percentage of output TM from a mode conversion region of a waveguide having different waveguide characteristics in accordance with some implementations.
Figure 9B:
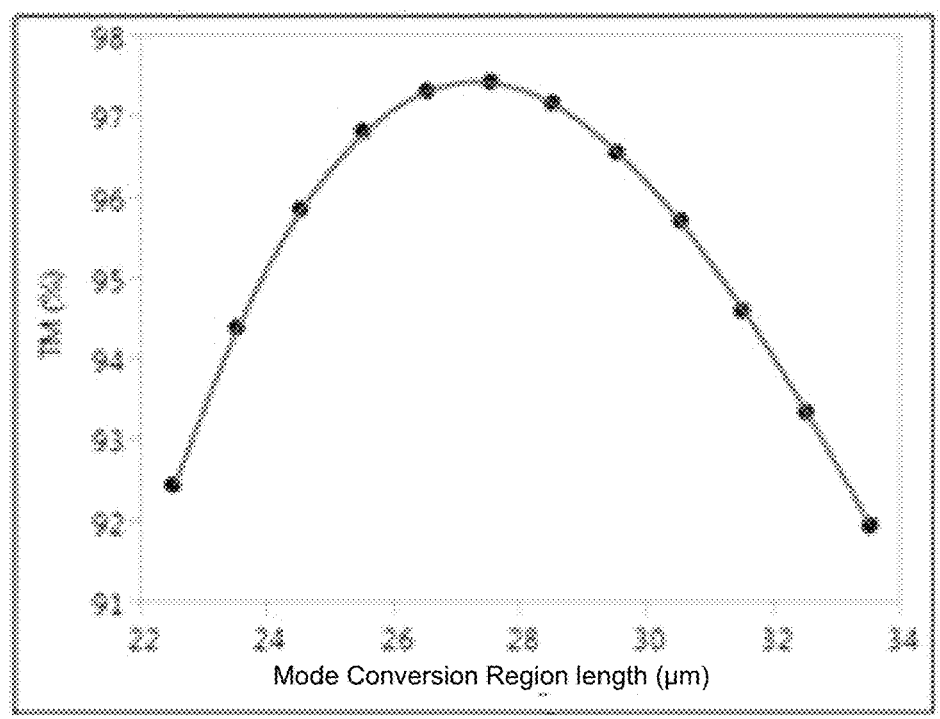
Figure 9C:
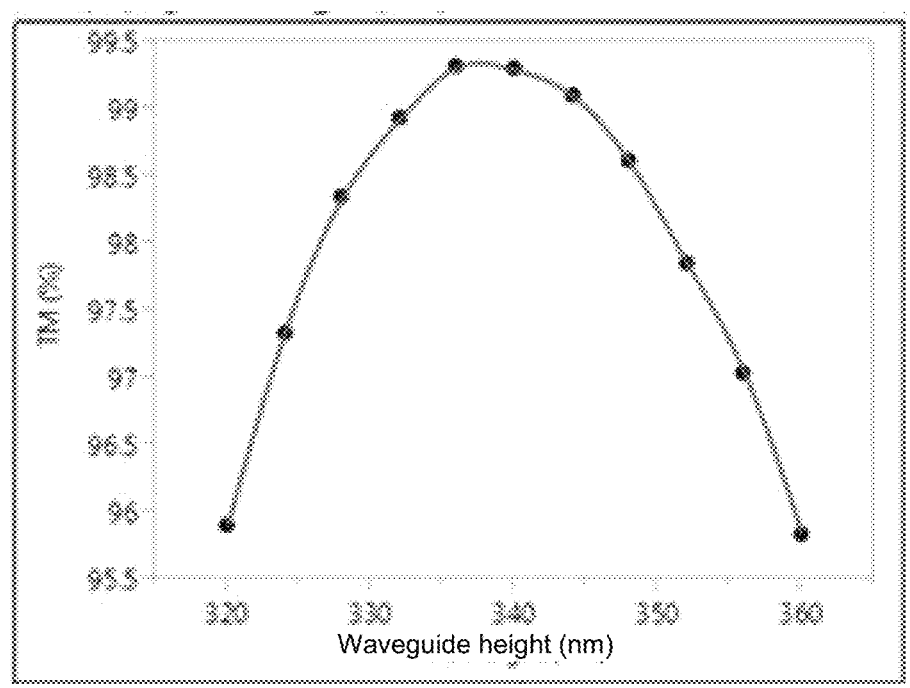
Figure 9D:
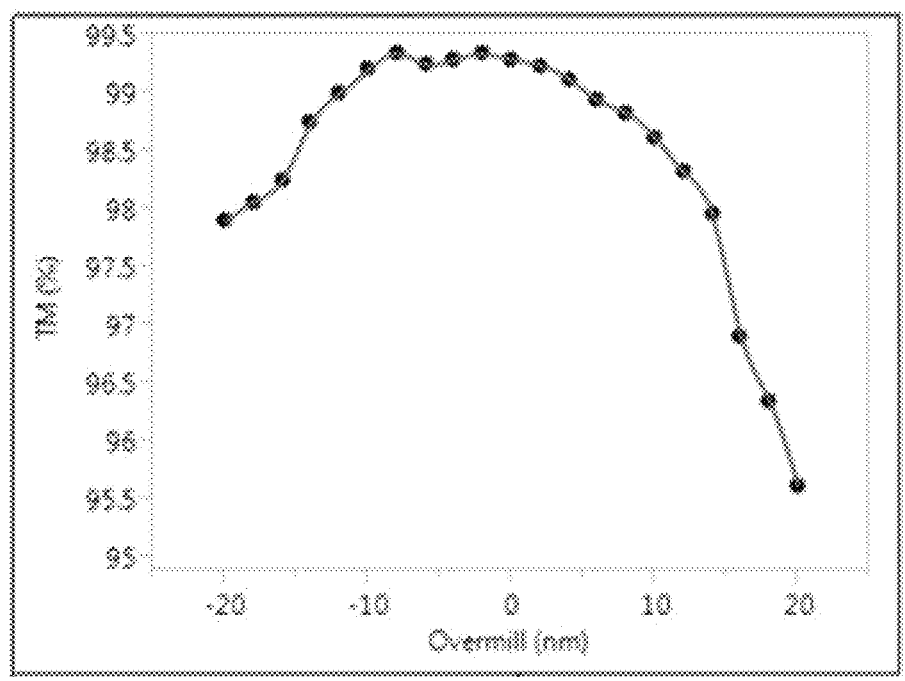

FIGS. 9A-9D illustrate the percentage of output TM from a mode conversion region of a waveguide having different waveguide characteristics. FIG. 9A shows the percentage of TM output from the mode conversion region of the waveguide versus the mode conversion region width. As can be seen in FIG. 9A, a maximum percentage of TM is output for a mode conversion region width of about 310-340 nm or about 320 nm. FIG. 9B shows the percentage of TM output from the mode conversion region of the waveguide versus the mode conversion region length. As can be seen in FIG. 9A, a maximum percentage of TM is output for a mode conversion region length of about 26-28 μm or about 27 μm. FIG. 9C illustrates the percentage of TM output from the mode conversion region of the waveguide versus the waveguide height (h3 in FIG. 3C). As can be seen in FIG. 9C, a maximum percentage of TM is output for a waveguide height of about 330-345 nm or about 335 nm. FIG. 9D shows the percentage of TM mode output from the mode conversion region of the waveguide versus the overmill. An overmill of zero is about halfway through the waveguide. A negative overmill represents an overmill that is less than halfway through the waveguide and a positive overmill represents an overmill that is more than halfway through the waveguide. As can be seen in FIG. 9D, a maximum percentage of TM is output for a waveguide having an overmill of about −15 to about +10 or about −10 to about +5.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method for forming a write head, comprising:
depositing a first waveguide layer;
depositing a second waveguide layer adjacent to the first waveguide layer;
applying a first mask to a substrate parallel surface of the second waveguide layer creating a masked portion and an exposed portion of the second waveguide layer;
etching the exposed portion of the second waveguide layer;
applying a second mask to the substrate parallel surface of the second waveguide layer creating masked sections and exposed sections of the first and second waveguide layers; and
milling the exposed sections of both the first and the second waveguide layers, wherein the second layer has a cross sectional area in a plane perpendicular to the light propagation direction that increases along the light propagation direction, the cross sectional area being smaller proximate to an input coupler and larger proximate to a near field transducer (NFT).

2. The method of claim 1, further comprising forming a stop layer on the first waveguide layer before depositing the second waveguide layer.

3. The method of claim 2, wherein the stop layer comprises Yttria.

4. The method of claim 1, further comprising after the etching, filling the etched portion with a cladding material.

5. The method of claim 1, further comprising, after the milling, filling the milled sections with a cladding material.

6. The method of claim 1, wherein at least one of the first waveguide layer and the second waveguide layer comprises $NbO_x$.

7. The method of claim 1, wherein at least one of the first mask and the second mask is applied with a tolerance of 50 nm.

8. A method for forming a write head, comprising:
depositing a first waveguide layer;
depositing a second waveguide layer adjacent to the first waveguide layer;
applying a first mask to a substrate parallel surface of the second waveguide layer creating masked portions and exposed portions of the first and second waveguide layers;
etching the exposed portions of the first and second waveguide layers;
applying a second mask to the substrate parallel surface of the second waveguide layer, the second mask creating a masked section and an exposed section of the second waveguide layer; and
milling the exposed section of the second waveguide layer, wherein the second layer has a cross sectional area in a plane perpendicular to the light propagation direction that increases along the light propagation direction, the cross sectional area being smaller proximate to an input coupler and larger proximate to a near field transducer (NFT).

9. The method of claim 8, further comprising, after the milling, filling the milled section with a cladding material.

10. The method of claim 8, further comprising, after the etching, filling the etched portion with a cladding material.

11. The method of claim 8, wherein at least one of the first mask and the second mask is applied with a tolerance of 50 nm.

12. A method for forming a write head, comprising:
depositing a waveguide layer;
applying a first mask to a substrate parallel surface of the waveguide layer creating a first masked portion and a first exposed portion of the waveguide layer;
etching the first exposed portion of the waveguide layer;
applying a second mask to the substrate parallel surface of the waveguide layer, the second mask creating a second masked portion and a second exposed portion; and
milling the second exposed portion of the waveguide layer, wherein the waveguide layer has a cross sectional area in a plane perpendicular to the light propagation direction that increases along the light propagation direction, the cross sectional area being smaller proximate to an input coupler and larger proximate to a near field transducer (NFT).

13. The method of claim 12, wherein etching the first exposed portion of the waveguide layer comprises etching the first exposed portion of the waveguide layer to a predetermined thickness.

14. The method of claim 13, wherein the predetermined thickness is about half of a total thickness of the waveguide layer.

15. The method of claim 13, wherein milling the second exposed portion of the waveguide layer comprises milling the second exposed portion to a total thickness of the waveguide layer.

16. The method of claim 12, wherein etching the first exposed portion of the waveguide layer comprises etching the first exposed portion of the waveguide layer to a total thickness of the waveguide layer.

17. The method of claim 16, wherein milling the second exposed portion of the waveguide layer comprises milling the second exposed portion to a predetermined thickness of the waveguide layer.

18. The method of claim 17, wherein the predetermined thickness is about half of the total thickness of the waveguide layer.

19. The method of claim 12, further comprising, after the etching, filling the milled portion with a cladding material.

20. The method of claim 12, after the etching, filling the etched portion with a cladding material.

* * * * *